United States Patent
Parasuraman et al.

(10) Patent No.: US 10,108,533 B1
(45) Date of Patent: Oct. 23, 2018

(54) ENTERPRISE FRAMEWORK FOR EFFICIENT SOFTWARE DEPLOYMENT

(71) Applicant: Bank of America Corporation, Charlotte, NC (US)

(72) Inventors: Nurani R. Parasuraman, Irving, TX (US); Rajsekhar Singha Roy, Addison, TX (US); Prabhat Ranjan, Plano, TX (US); Ketulkumar Vinodchandra Joshi, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/713,891

(22) Filed: Sep. 25, 2017

(51) Int. Cl.
  *G06F 9/44* (2018.01)
  *G06F 11/36* (2006.01)
  *G06F 8/60* (2018.01)
  *G06F 8/71* (2018.01)

(52) U.S. Cl.
  CPC .......... *G06F 11/3664* (2013.01); *G06F 8/60* (2013.01); *G06F 8/71* (2013.01); *G06F 11/3688* (2013.01)

(58) Field of Classification Search
  None
  See application file for complete search history.

(56) References Cited

U.S. PATENT DOCUMENTS

| | | |
|---|---|---|
| 4,558,413 A | 12/1985 | Schmidt et al. |
| 4,912,637 A | 3/1990 | Sheedy et al. |
| 5,649,200 A | 7/1997 | Leblang et al. |
| 5,675,802 A | 10/1997 | Allen et al. |
| 5,845,128 A | 12/1998 | Noble et al. |
| 5,903,897 A | 5/1999 | Carrier, III et al. |
| 6,073,214 A | 6/2000 | Fawcett |
| 6,094,679 A | 7/2000 | Teng et al. |
| 6,223,343 B1 | 4/2001 | Hopwood et al. |
| 6,385,768 B1 | 5/2002 | Ziebell |
| 7,134,122 B1 | 11/2006 | Sero et al. |
| 7,146,608 B1 | 12/2006 | Newman et al. |
| 7,496,645 B2 | 2/2009 | Yeung et al. |
| 7,680,932 B2 | 3/2010 | Defaix et al. |
| 8,176,484 B2 | 5/2012 | Sero et al. |
| 8,365,140 B2 | 1/2013 | Heyhoe et al. |
| 8,438,562 B2 | 5/2013 | Sero et al. |

(Continued)

*Primary Examiner* — Chameli Das
(74) *Attorney, Agent, or Firm* — Michael A. Springs; Moore & Van Allen PLLC; Patrick B. Horne (57) ABSTRACT

A system executes an enterprise framework for efficient software deployment using a Software Deployment Management (SDM) environment such as Pega®. The system includes an orchestration framework to receive a single input from an administrator; and in response to receiving the single input from the administrator, initiating an end-to-end software deployment process. A smart framework receives instructions from the orchestration framework to initiate the end-to-end software deployment process; manages a rule-set for code development; and packages a product based on developed code. A shell script stores the product in a versioning repository; and publishes a release note corresponding to the product. The orchestration framework deploys the product to a testing environment; and performs a restart for each server. The smart framework validates deployment; and performs a diagnostic check. A testing framework performs a smoke test and a regression test.

18 Claims, 6 Drawing Sheets

(56) References Cited

U.S. PATENT DOCUMENTS

| | | |
|---|---|---|
| 8,677,315 B1 | 3/2014 | Anderson et al. |
| 8,813,067 B2 | 8/2014 | Sero et al. |
| 9,141,382 B2 | 9/2015 | Heyhoe et al. |
| 9,286,187 B2 | 3/2016 | Brucker et al. |
| 9,606,903 B2 | 3/2017 | Murugesan |
| 9,658,833 B2 | 5/2017 | Heyhoe et al. |
| 2004/0261053 A1 | 12/2004 | Dougherty et al. |
| 2006/0271341 A1* | 11/2006 | Brown .................. G06F 8/20 703/1 |
| 2009/0019420 A1 | 1/2009 | Johnson |
| 2009/0300580 A1 | 12/2009 | Heyhoe et al. |
| 2010/0257151 A1* | 10/2010 | Lohman .............. G06Q 10/06 707/715 |
| 2010/0299327 A1* | 11/2010 | Kiefer ............. G06F 17/30917 707/736 |
| 2010/0318969 A1* | 12/2010 | Petrovicky ............ G06F 8/60 717/124 |
| 2015/0293834 A1 | 10/2015 | Potdar |
| 2017/0093910 A1* | 3/2017 | Gukal ................ H04L 63/1416 |
| 2017/0372247 A1* | 12/2017 | Tauber .................. G06F 8/30 |

\* cited by examiner

NaN non-transitory computer readable medium comprising computer readable instructions. The instructions include an orchestration framework comprising instructions executable to receive a single input from an administrator; in response to receiving the single input from the administrator, initiating an end-to-end software deployment process.

The instructions also include a smart framework comprising instructions executable to receive instructions from the orchestration framework to initiate the end-to-end software deployment process; in response, managing a rule-set for code development; and package a product based on developed code.

The instructions also include a shell script comprising instructions executable to in response to the packaging of the product, store the product in a database; publish a release note corresponding to the product; wherein the orchestration framework instructions are further executable to deploy the product to a testing environment comprising a plurality of servers; perform a synchronized cluster restart for each server effected by testing of the product; wherein the smart framework instructions are further executable to validate deployment of the product to the testing environment; perform a diagnostic check comprising confirming each of the servers effected by testing of the product are powered and functional.

The instructions also include a testing framework comprising instructions executable to perform a smoke test comprising running of only those scripts necessary for general function of the product; and in response to successful results of the smoke test, perform a regression test comprising running of a plurality of additional scripts necessary for complete function of the product.

In some embodiments, the computer readable instructions comprise an SQL deployment framework executable to deploy the package to systems requiring SQL deployment. In some such embodiments, the SQL deployment framework is part of the orchestration framework. In some such embodiments, the orchestration framework is further executable to transmit a notification to at least one interested party in response to successful SQL deployment.

In some embodiments, the orchestration framework is further executable to in response to successful results of the regression testing, deploy the package to a working environment different than the testing environment.

In some embodiments, the orchestration framework is further executable to transmit a notification to at least one interested party in response to successful package deployment to the testing environment.

In some embodiments, the orchestration framework is further to transmit a notification to at least one interested party in response to successful cluster restart for each server effected by testing of the product.

In some embodiments, the orchestration framework is further to transmit a notification to at least one interested party in response to successful deployment validation.

According to embodiments of the invention, a computer implemented method for executing an enterprise framework for efficient software deployment using a Software Deployment Management (SDM) environment includes receiving, by an orchestration framework, a single input from an administrator; in response to receiving the single input from the administrator, initiating, by the orchestration framework, an end-to-end software deployment process; receiving instructions, by a smart framework from the orchestration framework, to initiate the end-to-end software deployment process; in response, managing, by the smart framework, a rule-set for code development; and packaging, by the smart framework, a product based on developed code; in response to the packaging of the product, storing, by a shell script, the product in a database; publishing, by the shell script, a release note corresponding to the product; deploying, by the orchestration framework, the product to a testing environment comprising a plurality of servers; performing, by the orchestration framework, a synchronized cluster restart for each server effected by testing of the product; validating, by the smart framework, deployment of the product to the testing environment; performing, by the smart framework, a diagnostic check comprising confirming each of the servers effected by testing of the product are powered and functional; performing, by a testing framework, a smoke test comprising running of only those scripts necessary for general function of the product; and, in response to successful results of the smoke test, performing, by the testing framework, a regression test comprising running of a plurality of additional scripts necessary for complete function of the product.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Today there are many steps application developers must complete to deploy certain software within an entity. There is a need for developing and deploying a framework for automating and simplifying the process. An example of such software is the Pega® Platform, which is provided by Pegasystems Inc. of Boston, Mass. It provides for an adaptive, cloud-architected software that empowers people to rapidly deploy, and easily extend and change application to meet strategic business needs, providing capabilities in content and resource management and business process management (BPM). This software functions to automate the workflow of tasks, building and delivering software.

Embodiments of the present invention provide for a software deployment management (SDM) single-click deployment using BPM software, such as the Pega® solution noted above. Embodiments provide efficiency improvements over traditional software deployment processes by automating numerous steps and eliminating the need for human input for various steps in the process of software deployment. The invention utilizes a Shell Script and three primary frameworks: (i) the Smart CICD (Continuous Integration and Continuous Deployment) Framework, which functions as SDM software packaging and rule management, (ii) the Orchestration Framework (which may be BD Portal or Jenkins or the like), and (iii) the Testing Framework (which may be a UFT/USE framework). The SDM software packaging performed by the Smart CICD provides a solution for taking developers' code, grouping it together in a manageable package and moving it effectively to the next desired environment and is a tool that was developed inside the SDM software environment. The Orchestration Framework is a tool outside of the SDM environment and it manages histories of deployment of various versions of software. Once a software deployment has occurred, the Testing Framework tests the deployment prior to moving the deployment to a "live" status.

To set the foundation for describing the invention, a brief discussion of the traditional software deployment process may be helpful. First, developers develop the code that will ultimately become the software being deployed to an entity's system. Next, a unit test is performed on the code and a rule-set may manage the various versions of the code. The code is packaged as a product and the package is saved into a repository (e.g., "SVN") and the repository is maintained historically (code may be available to future developers years in the future if desired). Then, a release note regarding the package may be published to the involved parties. Next, the package may be deployed using an orchestration tool such as BD portal (including both SQL deployment and package deployment). An application cluster restart is performed, the deployment is validated manually, and a diagnostic check is performed. The diagnostic test is a test to confirm that all systems involved in the testing are powered on and running properly for the test. Historically, the diagnostic check is performed manually. Next, a smoke test is performed and a regression test is performed.

Embodiments of the invention may include grouping development, unit test and SQL deployment, which are completed first. Then, by receiving a single input from an administrator using the Orchestration Framework (e.g., BD Portal), the invention manages the rule-set through the Smart CICD Framework. The invention generates a package of the code (e.g., a "zip" file) by leveraging the Smart CICD Framework, places the package into the repository (SVN) using a Shell Script. The Shell Script is a module that, in response to the code being packaged, transmits the packaged code to the repository with instructions for storing the packaged code. The Shell Script module also updates an audit file that includes details regarding all of the packaged codes (e.g., version names, file names, update times, identity of who modified code last, etc.) that have been stored in the repository. Once the repository has been updated, the Shell Script module automatically publishes a release note corresponding to the packaged code to the concerned parties detailing what will be deployed, including details regarding the packaged code such as t. Next, embodiments of the invention automatically initiate deployment to the next environment within the entity systems, which is the test environment. When the test deployment is completed, a notification is transmitted to concerned parties including information regarding the success or failure of the test deployment. The invention then automatically asks the SDM software to perform an application cluster restart. For example, the invention may identify each of the impacted servers within the entity network environment that are running the application and triggers the restart of each of those impacted servers. Once the automated restart has been performed, the invention triggers a notification to concerned parties that the automated restart has been completed.

Once the Orchestration Framework recognizes (and/or is notified) that the automated restart has been completed, the invention uses the Smart CICD Framework to perform automated diagnostic checks. The automated diagnostic check includes identifying which systems must be running effectively in order to perform the testing steps. The diagnostic check is performed and a notification is transmitted to the concerned parties regarding the results of the diagnostic check. If the diagnostic check determines that all necessary systems are performing effectively, then the invention initiates the smoke test by leveraging the USE Framework. This smoke test involves the calling of the specific scripts of the application to determine whether it is functioning properly. A smoke test is a cursory or high-level test to confirm that everything with regard to the package deployment is working appropriately after the deployment. For example, for purposes of the smoke test, the invention does not call the numerous scripts related to each functionality of the application, but rather only calls the primary scripts to ensure general functionality of the application. In one example, the smoke test may create a simple case to apply to the application (i.e., a work object or item that may be predetermined by a qualification team or "hard-coded" into the invention processing) that is a test case to ensure general functionality of the application. Once the smoke test has been performed, the invention transmits results of the smoke test to concerned parties.

Then, provided the smoke test results are acceptable, the invention automatically triggers the regression test leveraging the USE Framework. The regression test is a comprehensive test of the application including all the scripts for all the functions of the application. So, for example, for a particular functionality, the smoke test may only test one out of one hundred scripts associated with the function, but the regression test tests each and every one of the one hundred scripts associated with the function. Once the regression test has been completed, the regression test results are then transmitted to the concerned parties through a notification. In other implementations, the qualification team may predetermined which of the various scripts to be tested during the automated regression testing and pre-program the process to run those scripts for testing.

In other embodiments, the system may also automate the SQL deployment step and provide an automatic notification regarding the SQL deployment.

In summary, embodiments of the invention provide a system for executing an enterprise framework for efficient software deployment using a Software Deployment Management (SDM) environment such as Pega®. The system typically includes an orchestration framework to receive a single input from an administrator; and in response to receiving the single input from the administrator, initiating an end-to-end software deployment process. A smart framework receives instructions from the orchestration framework to initiate the end-to-end software deployment process; in response, manages a rule-set for code development; and packages a product based on developed code. A shell script, in response to the packaging of the product, stores the product in a database; and publishes a release note corresponding to the product. The orchestration framework deploys the product to a testing environment comprising a plurality of servers; and performs a synchronized cluster restart for each server effected by testing of the product. The smart framework validates deployment of the product to the testing environment; and performs a diagnostic check comprising confirming each of the servers effected by testing of the product are powered and functional. A testing framework performs a smoke test comprising running of only those scripts necessary for general function of the product; and, in response to successful results of the smoke test, perform a regression test comprising running of a plurality of additional scripts necessary for complete function of the product.

Figure 1:
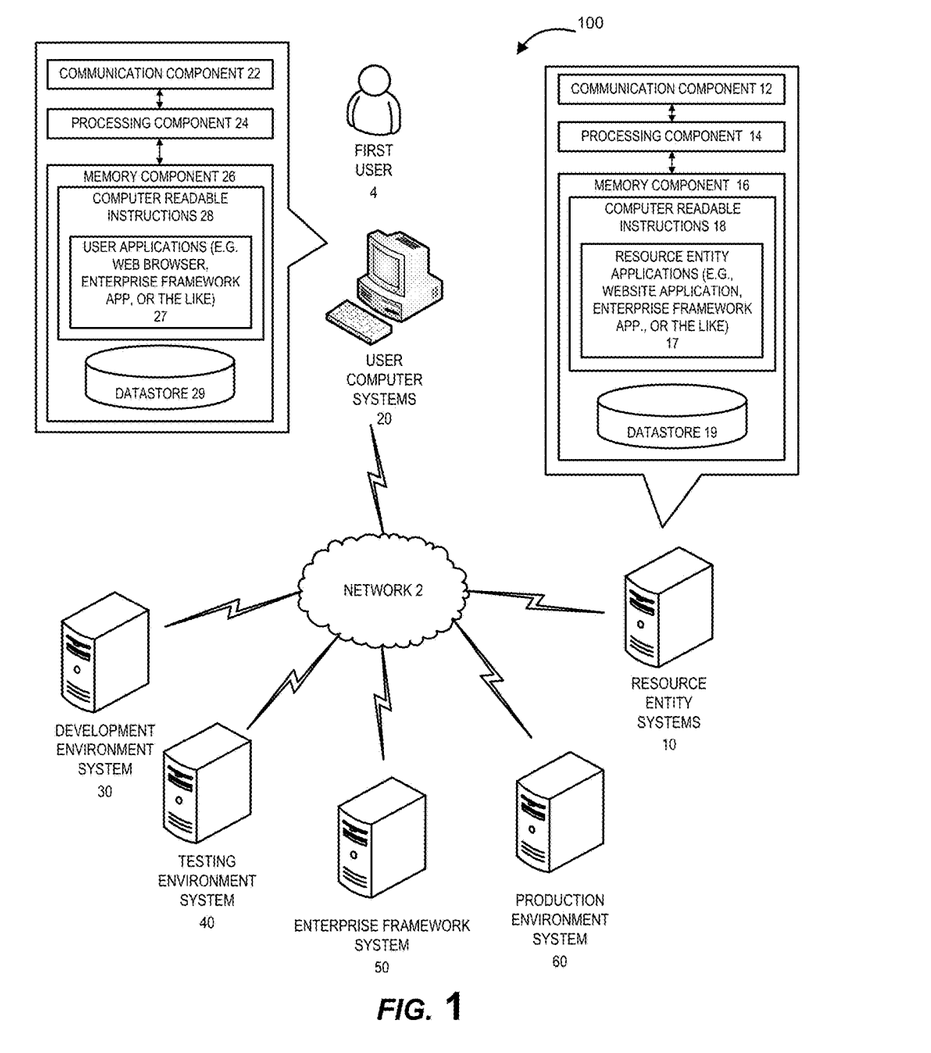
FIG. 1 illustrates a block diagram illustrating the enterprise framework system environment, in accordance with embodiments of the present invention.

Referring now to FIG. 1, in accordance with embodiments of the invention, the terms "resource entity system" may include any organization that processes financial transactions including, but not limited to, banks, credit unions, savings and loan associations, card associations, settlement associations, investment companies, stock brokerages, asset management firms, insurance companies and the like. Furthermore, embodiments of the present invention use the term "user" or "customer." It will be appreciated by someone with ordinary skill in the art that the user or customer may be a customer of the financial institution or a potential customer of the financial institution or an employee of the financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, personal computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

FIG. 1 illustrates a system and environment 100 for executing an enterprise framework for efficient software deployment, in accordance with embodiments of the invention. As illustrated in FIG. 1, one or more resource entity systems 10 are operatively coupled, via a network 2, to user computer systems 20, a development environment system 30, a testing environment system 40, an enterprise framework environment 50, production environment system 60, one or more server systems (not shown), and/or one or more other systems (not illustrated). In this way, the user 4 (e.g., one or more associates, employees, agents, contractors, sub-contractors, third-party representatives, customers, or the like), through a user application 27 (e.g., web browser, enterprise framework application, or the like), may access resource entity applications 17 (e.g., website, enterprise framework application, or the like) of the resource entity systems 10 to submit one or more development codes associated with application development to the resource entity systems 10. In some embodiments, the enterprise framework application or tool may be a part of an independent system or environment. In such an embodiment, the enterprise framework environment 50 may be maintained and operated by the resource entity systems 10. The enterprise framework environment may comprise one or more processing devices operatively coupled to the one or more memory devices and configured to execute computer readable code stored in the one or more memory devices.

In some embodiments, the development environment system 30, the testing environment system 40, the enterprise framework system 50, and the production environment system 60 may be a part of the resource entity systems 10. The development environment system 30, the testing environment system 40, the enterprise framework system 50, and the production environment system 60 may comprise one or more processing devices operatively coupled to the one or more memory devices and configured to execute computer readable code stored in the one or more memory devices. In some embodiments, the development environment system 30, the testing environment system 40, the enterprise framework system 50, and the production environment system 60 may be a part of single environment system, wherein the single environment system may be maintained by the resource entity systems 10.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the resource entity systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the user computer systems 20, the interaction entity systems 30, third-party systems 40, or other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like. In one embodiment of the present invention, the one or more processing components 14 automatically implement one or more automated counter measures to mitigate impact of the one or more exposures.

As further illustrated in FIG. 1, the resource entity systems 10 comprise computer-readable instructions 18 stored in the memory component 16, which in one embodiment includes the computer-readable instructions 18 of the resource entity application 17 (e.g., website application, enterprise framework application, or the like). In some embodiments, the one or more memory components 16 include one or more data stores 19 for storing data related to the resource entity systems 10, including, but not limited to, data created, accessed, and/or used by the resource entity application 17.

Figure 2:
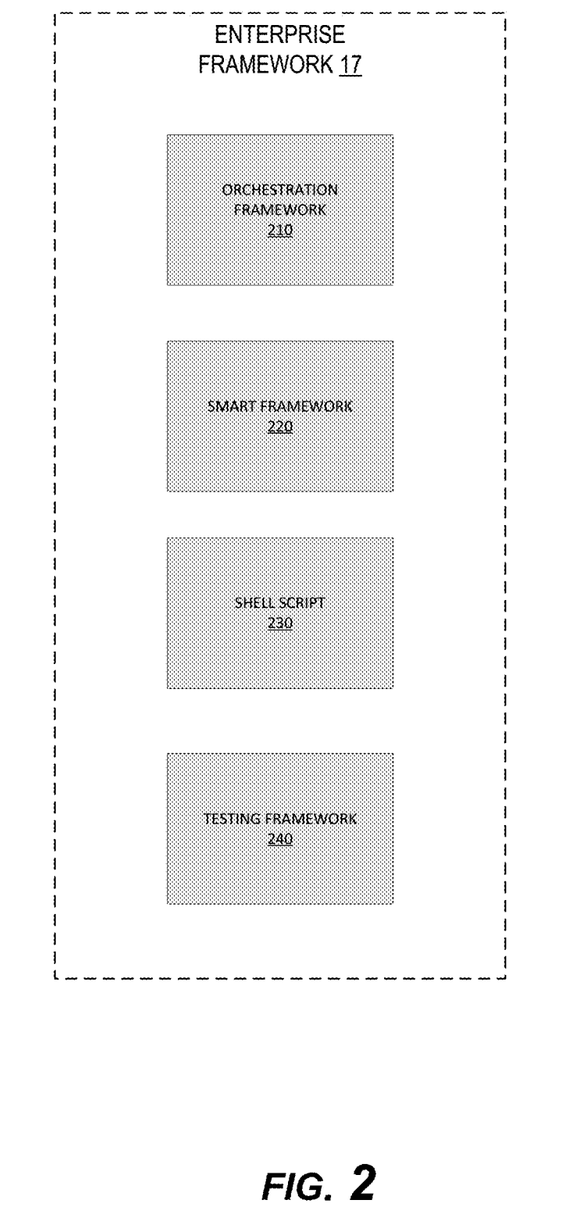
FIG. 2 illustrates a diagram of an enterprise framework for efficient software deployment according to embodiments of the invention.

Referring to FIG. 2, in various embodiments of the present invention, the enterprise framework application 17 comprises one or more of the orchestration framework 210, the smart framework 220, the testing framework 240, the SQL framework (not shown), and/or the shell script 230 and performs one or more steps described in the process flow 400.

Referring back to FIG. 1, users 4 may access the resource entity application 17, or other applications, through a user computer system 20. The user computer system 20 may be a desktop, mobile device (e.g., laptop, smartphone device, PDA, tablet, or other mobile device), or any other type of computer that generally comprises one or more communication components 22, one or more processing components 24, and one or more memory components 26.

The one or more processing components 24 are operatively coupled to the one or more communication components 22 and the one or more memory components 26. The one or more processing components 24 use the one or more communication components 22 to communicate with the network 2 and other components on the network 2, such as, but not limited to, the user computer systems 20, a plurality of user computer systems 30, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4. In some embodiments of the present invention, the enterprise framework application in the user computer systems 20 and the plurality of user computer systems 30 may enable a software deployment interface to display information associated with the development, deployment, testing, or other portions of the end-to-end process of software deployment to the user and receive information associated with the process.

As illustrated in FIG. 1, the user computer systems 20 may have computer-readable instructions 28 stored in the one or more memory components 26, which in one embodiment includes the computer-readable instructions 28 for user applications 27, such as event prediction application (e.g., apps, applet, or the like), portions of enterprise framework application, a web browser or other apps that allow the user 4 to take various actions, including allowing the user 4 to access applications located on other systems, or the like. In some embodiments, the user 4 utilizes the user applications 27, through the user computer systems 20, to access the resource entity applications 17 to perform exposure analysis. Moreover, in some embodiments the user 4 may also utilize the user applications 27 to implement one or more corrective measures to mitigate the impact of one or more errors or problems with the end-to-end process. The plurality of user computer systems 30 associated with a plurality of user 5 may include similar structure as that of the user computer systems 20.

Figure 3A:
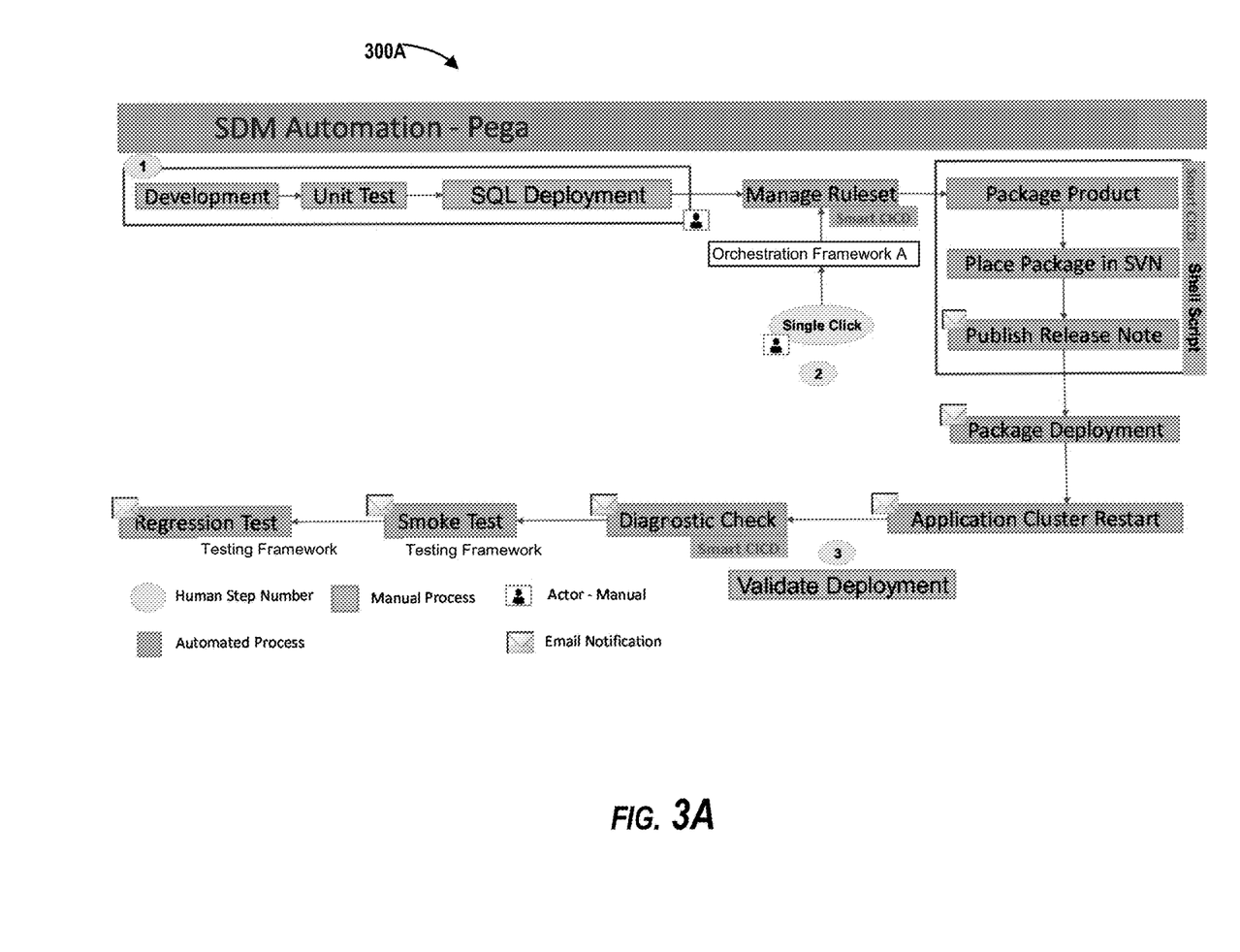
FIGS. 3A and 3B illustrate combined block diagram and process flows 300A and 300B, respectively, for efficient software deployment according to embodiments of the invention.
Figure 3B:
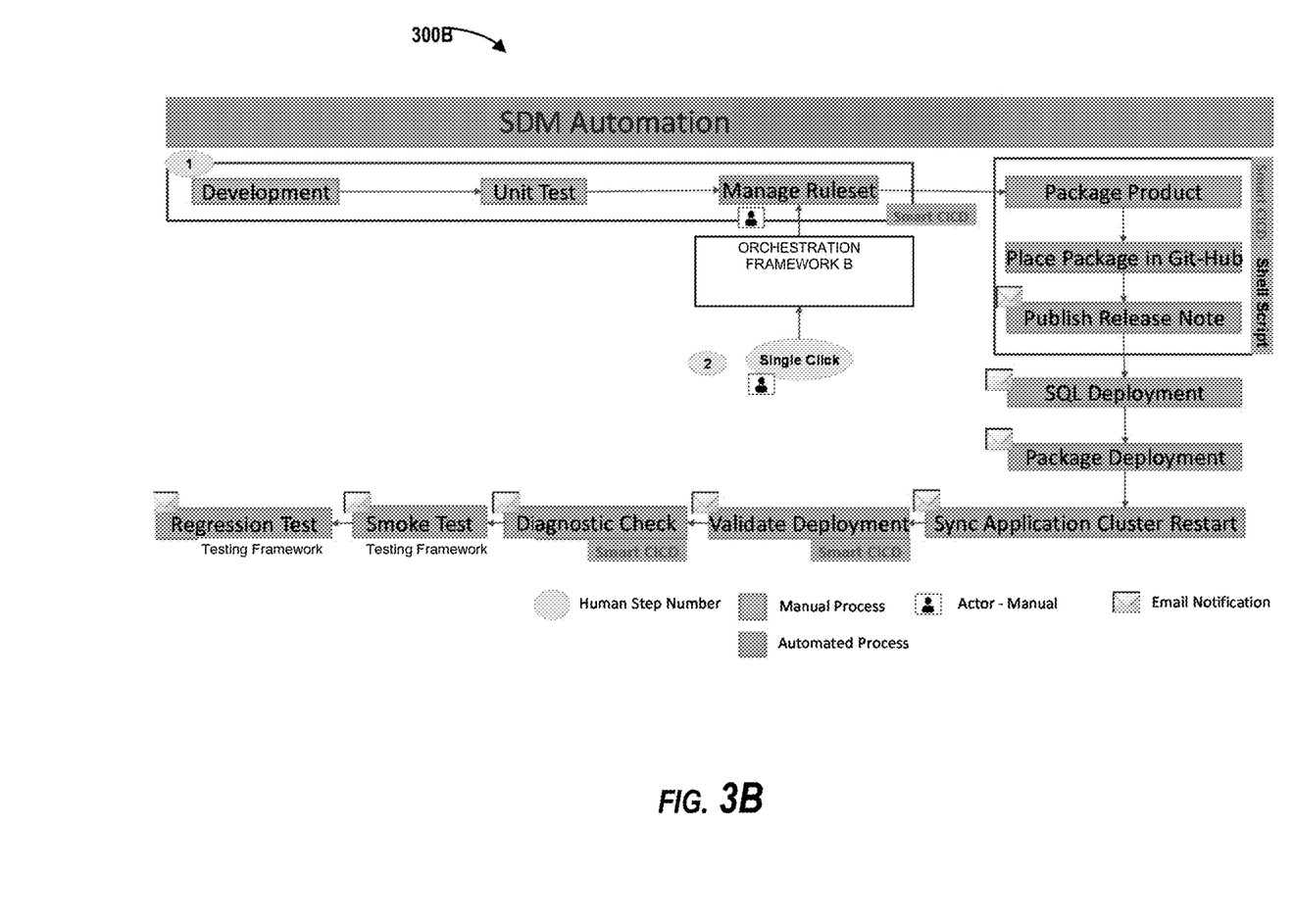

Referring now to FIGS. 3A and 3B, a combined block diagram and process flow 300A and 300B, respectively, are provided for efficient software deployment according to embodiments of the invention.

Figure 4A:
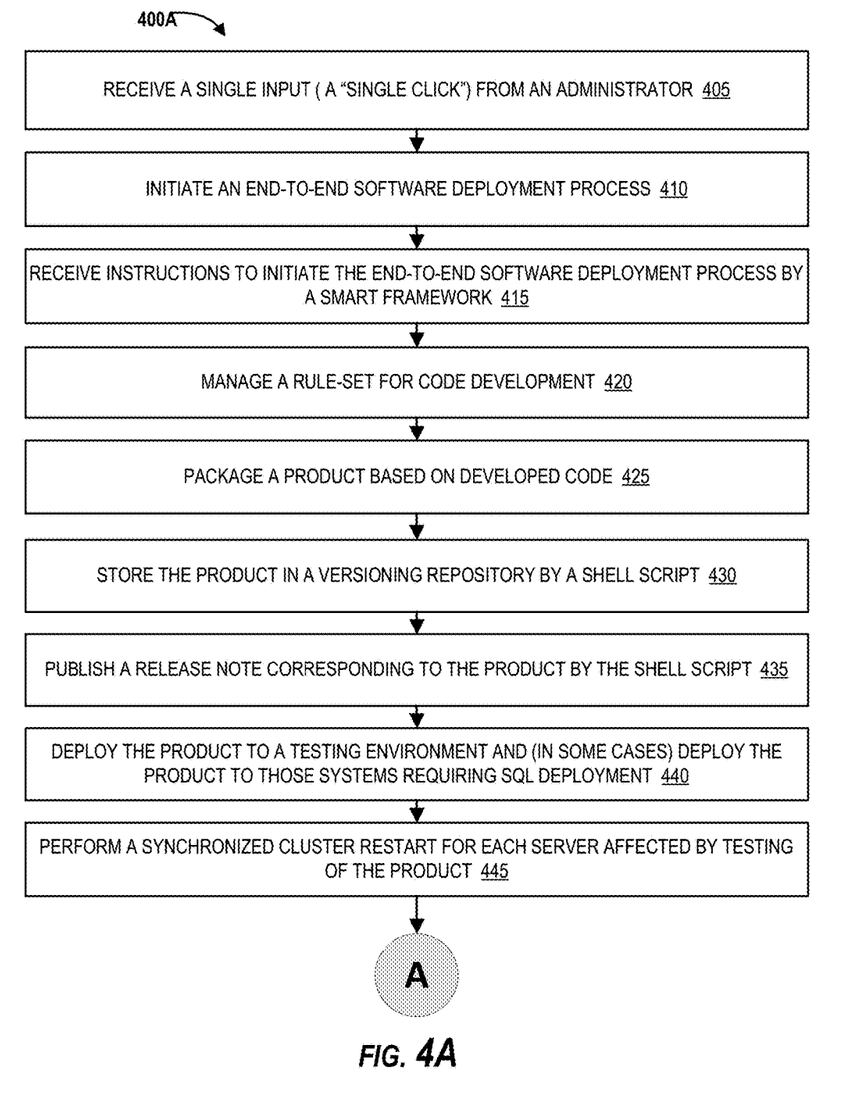
FIGS. 4A and 4B illustrate, a general process flow 400A and 400B, respectively, for executing an enterprise framework for efficient software deployment according to embodiments of the invention.
Figure 4B:
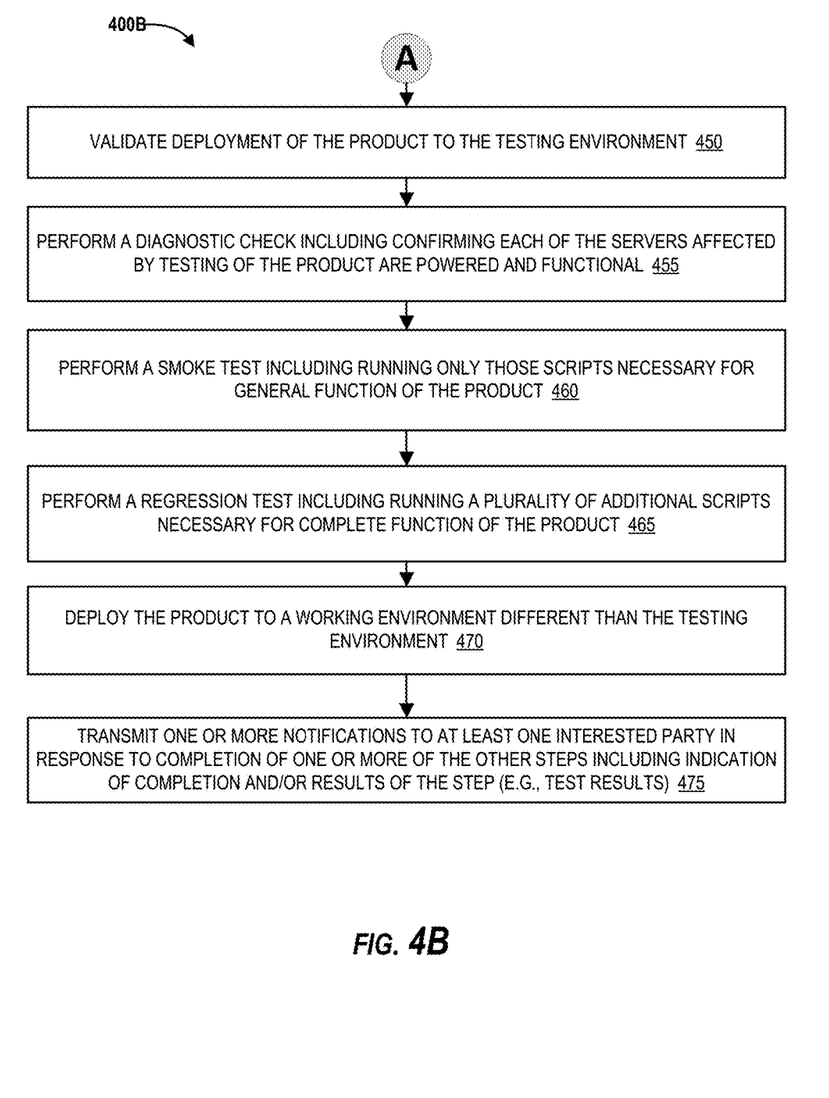

Referring now to FIGS. 4A and 4B, a general process flow 400A and 400B, respectively, are provided for efficient software deployment according to embodiments of the invention. The first step, as represented by block 405, is to receive a single input from an administrator. This single input may be referred to as a "single click" because the orchestration framework may be configured to receive a single click from the administrator to initiate the end-to-end process for efficient software deployment.

The next step, as represented by block 410, is for the orchestration framework to initiate the end-to-end software deployment process in response to receiving the single click input.

The next step, as represented by block 415, is for the smart framework to receive instructions to initiate the end-to-end software deployment process and, as represented by block 420, for the smart framework to manage a rule-set for code development. The smart framework then packages a product based on developed code, as represented by block 425.

A shell script then stores the product in a database as represented by block 430 and publishes a release note corresponding to the product, as represented by block 435.

The orchestration framework then deploys the product to a testing environment that may include a number of servers configured to test the product. Next, the orchestration framework performs a synchronized cluster restart of the servers that will be affected by the testing, as represented by block 445.

Next, as represented by block 450, the smart framework validates the deployment of the product to the testing environment. Then, the smart framework performs a diagnostic check that includes confirming each of the servers affected by the testing of the product are powered and functional, as represented by block 455.

Then a testing framework performs testing of the product. As represented by block 460, the testing framework performs a smoke test, which includes running only those scripts necessary for general function of the product. The testing framework, as represented by block 465, then performs a regression test, which includes running a number of additional scripts of the product necessary for complete functionality of the product. In various embodiments, a predetermined script (or scripts) may be run for the smoke test and predetermined scripts or all the scripts of the product may be run for the regression test.

In some embodiments, the orchestration framework, in response to successful completion of the regression testing, then deploys the product to a working environment that is different than the testing environment, as represented by block 470.

In various embodiments, as represented by block 475, the orchestration framework transmits one or more notifications to at least one interested party (such as an administrator). Such notification(s) may be in response to completion of one or more of the above-described steps of the process. The notification(s) may include indication of completion and/or results of the process step. For example, the notification may include an indication of the completion of the regression test as well as information regarding the results of the regression test.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, JAVA, PERL, SMALLTALK, C++, SAS, SQL, PYTHON, OBJECTIVE C, JAVASCRIPT, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for executing an enterprise framework for efficient software deployment using a Software Deployment Management (SDM) environment, the system comprising:
   one or more memory devices;
   one or more processing devices operatively coupled with the one or more memory devices;
   an orchestration framework stored in the one or more memory devices, wherein the orchestration framework is stored outside the SDM environment, the orchestration framework comprising instructions executable by the one or more processing devices to:
      receive a single input from an administrator; and
      in response to receiving the single input from the administrator, initiate an end-to-end software deployment process;
   a smart framework stored inside the SDM environment, the smart framework comprising instructions executable to:
      receive instructions from the orchestration framework to initiate the end-to-end software deployment process;
      in response, manage a rule-set for code development; and
      package, automatically, a product based on developed code;
   a shell script comprising instructions executable to:
      in response to the packaging of the product, store, automatically, the product in a versioning repository; and
      publish, automatically, a release note corresponding to the product;
   wherein the orchestration framework instructions are further executable to:
      deploy, automatically in response to the publishing of the release note, the product to a testing environment comprising a plurality of servers; and
      perform, automatically, a synchronized cluster restart for each server effected by testing of the product;
   wherein the smart framework instructions are further executable to:
      validate deployment of the product to the testing environment;
      perform, automatically, a diagnostic check comprising confirming each of the servers effected by testing of the product are powered and functional;
   a testing framework comprising instructions executable to:
      perform, automatically, a smoke test comprising running of only those scripts necessary for general function of the product; and
      in response to successful results of the smoke test, perform, automatically, a regression test comprising running of a plurality of additional scripts necessary for complete function of the product; and
   an SQL deployment framework stored in the one or more memory devices, the SQL framework comprising instructions executable by the one or more processing devices to:
      deploy, automatically, the product to systems requiring SQL deployment.

2. The system of claim 1, wherein the SQL deployment framework is part of the orchestration framework.

3. The system of claim 1, wherein the orchestration framework instructions are further executable by the one or more processing devices to:
   transmit, automatically, a notification to at least one interested party in response to successful SQL deployment.

4. The system of claim 1, wherein the orchestration framework instructions are further executable by the one or more processing devices to:
   in response to successful results of the regression testing, deploy the product to a working environment different than the testing environment.

5. The system of claim 1, wherein the orchestration framework instructions are further executable by the one or more processing devices to:
   transmit a notification to at least one interested party in response to successful package deployment to the testing environment.

6. The system of claim 1, wherein the orchestration framework instructions are further executable by the one or more processing devices to:
   transmit a notification to at least one interested party in response to successful cluster restart for each server effected by testing of the product.

7. The system of claim 1, wherein the orchestration framework instructions are further executable by the one or more processing devices to:
   transmit a notification to at least one interested party in response to successful deployment validation.

8. The system of claim 1, wherein the orchestration framework instructions are further executable by the one or more processing devices to:
   transmit a notification to at least one interested party in response to successful diagnostic check completion and satisfactory results.

9. The system of claim 1, wherein the orchestration framework instructions are further executable by the one or more transmit a notification to at least one interested party in response to successful smoke test completion with satisfactory results.

10. The system of claim 1, wherein the orchestration framework instructions are further executable by the one or more processing devices to:
transmit a notification to at least one interested party in response to successful regression test completion and satisfactory results.

11. The system of claim 1, wherein the orchestration framework instructions are further executable by the one or more processing devices to:
transmit a notification to at least one interested party in response to successful working environment package deployment.

12. A computer program product for executing an enterprise framework for efficient software deployment using a Software Deployment Management (SDM) environment, wherein the computer program product comprises at least one non-transitory computer readable memory medium comprising computer readable instructions, the instructions comprising:
an orchestration framework wherein the orchestration framework is stored outside the SDM environment, the orchestration framework comprising instructions executable to:
receive a single input from an administrator; and
in response to receiving the single input from the administrator, initiate an end-to-end software deployment process;
a smart framework stored inside the SDM environment, the smart framework comprising instructions executable to:
receive instructions from the orchestration framework to initiate the end-to-end software deployment process;
in response, manage a rule-set for code development; and
package, automatically, a product based on developed code;
a shell script comprising instructions executable to:
in response to the packaging of the product, store, automatically, the product in a versioning repository; and
publish, automatically, a release note corresponding to the product;
wherein the orchestration framework instructions are further executable to:
deploy, automatically in response to the publishing of the release note, the product to a testing environment comprising a plurality of servers; and
perform, automatically, a synchronized cluster restart for each server effected by testing of the product;
wherein the smart framework instructions are further executable to:
validate deployment of the product to the testing environment;
perform, automatically, a diagnostic check comprising confirming each of the servers effected by testing of the product are powered and functional;
a testing framework comprising instructions executable to:
perform, automatically, a smoke test comprising running of only those scripts necessary for general function of the product; and
in response to successful results of the smoke test, perform, automatically, a regression test comprising running of a plurality of additional scripts necessary for complete function of the product; and
an SQL deployment framework executable to:
deploy, automatically, the package to systems requiring SQL deployment.

13. The computer program product of claim 12, wherein the SQL deployment framework is part of the orchestration framework.

14. The computer program product of claim 12, wherein the orchestration framework is further executable to:
transmit a notification to at least one interested party in response to successful SQL deployment.

15. The computer program product of claim 12, wherein the orchestration framework is further executable to:
in response to successful results of the regression testing, deploy the package to a working environment different than the testing environment.

16. The computer program product of claim 12, wherein the orchestration framework is further executable to:
transmit a notification to at least one interested party in response to successful package deployment to the testing environment.

17. The computer program product of claim 12, wherein the orchestration framework is further to:
transmit a notification to at least one interested party in response to successful cluster restart for each server effected by testing of the product.

18. A computer implemented method for executing an enterprise framework for efficient software deployment using a Software Deployment Management (SDM) environment, the computer implemented method comprising:
receiving, by an orchestration framework stored outside the SDM environment, a single input from an administrator;
in response to receiving the single input from the administrator, initiating, by the orchestration framework, an end-to-end software deployment process;
receiving instructions, by a smart framework stored inside the SDM environment, to initiate the end-to-end software deployment process, wherein the instructions are transmitted to the smart framework by the orchestration framework;
in response, managing, by the smart framework, a rule-set for code development;
packaging, automatically by the smart framework, a product based on developed code;
in response to the packaging of the product, storing, automatically, by a shell script, the product in a versioning repository;
publishing, automatically by the shell script, a release note corresponding to the product;
deploying, automatically by the orchestration framework in response to the publishing of the release note, the product to a testing environment comprising a plurality of servers;
performing, automatically by the orchestration framework, a synchronized cluster restart for each server effected by testing of the product;
validating, by the smart framework, deployment of the product to the testing environment;
performing, automatically by the smart framework, a diagnostic check comprising confirming each of the servers effected by testing of the product are powered and functional;
performing, automatically by a testing framework, a smoke test comprising running of only those scripts necessary for general function of the product;

in response to successful results of the smoke test, performing, automatically by the testing framework, a regression test comprising running of a plurality of additional scripts necessary for complete function of the product; and deploying, automatically by a SQL deployment framework, the product to systems requiring SQL deployment.

\* \* \* \* \*